United States Patent [19]

Clark

[11] 4,171,013
[45] Oct. 16, 1979

[54] RETRACTABLE AWNING ASSEMBLY

[75] Inventor: Robert C. Clark, Anaheim, Calif.

[73] Assignee: A & E Plastik Pak Co., Inc., Industry, Calif.

[21] Appl. No.: 818,414

[22] Filed: Jul. 25, 1977

Related U.S. Application Data

[63] Continuation-in-part of Ser. No. 705,873, Jul. 16, 1976.

[51] Int. Cl.² ............................................. E04F 10/06
[52] U.S. Cl. ...................................... 160/22; 160/70; 135/5 AT
[58] Field of Search ................... 160/22, 23 R, 66, 67, 160/68, 70, 310; 135/5 AT

[56] References Cited

U.S. PATENT DOCUMENTS

| | | | |
|---|---|---|---|
| 1,984,329 | 12/1934 | Bell | 160/22 |
| 3,364,973 | 1/1968 | Railson | 160/22 |
| 3,923,074 | 12/1975 | McKee | 160/22 |

*Primary Examiner*—Peter M. Caun
*Attorney, Agent, or Firm*—Ellsworth R. Roston

[57] ABSTRACT

An awning assembly including an elongated storage case mounted on the side of a recreational vehicle, and having an extended position for providing shade and a retracted position for storage. A lead bar is connected to the outer edge of the awning, and the inner edge is connected to a spring-loaded take-up roller in the case. To brace and support the lead bar when the awning is unrolled and extended, automatically positioned, telescoping rafters extend between the ends of the case and the central portion of the lead bar, and telescoping legs pivoted on the ends of the lead bar are connectible to anchor brackets on the side of the vehicle. These legs are jointed between their ends to facilitate operation on a curved-sided vehicle, and are connected to the lead bar by swivels permitting compact folding into inconspicuous storage positions along the bottom of the case, where they are latched and partially concealed by a leg latch. When the awning is retracted, the lead bar becomes part of, and encloses, the case. Also disclosed is a special mounting bracket for holding the case on curved surfaces, and a wand-type tool facilitating manipulation of the parts of the assembly.

44 Claims, 27 Drawing Figures

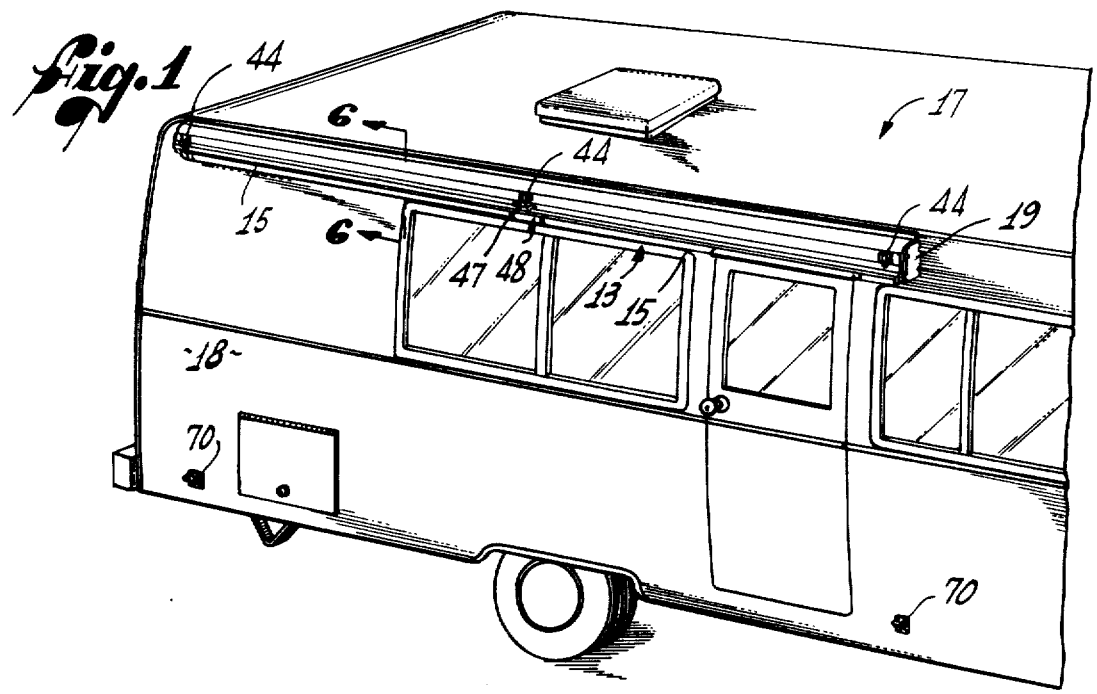
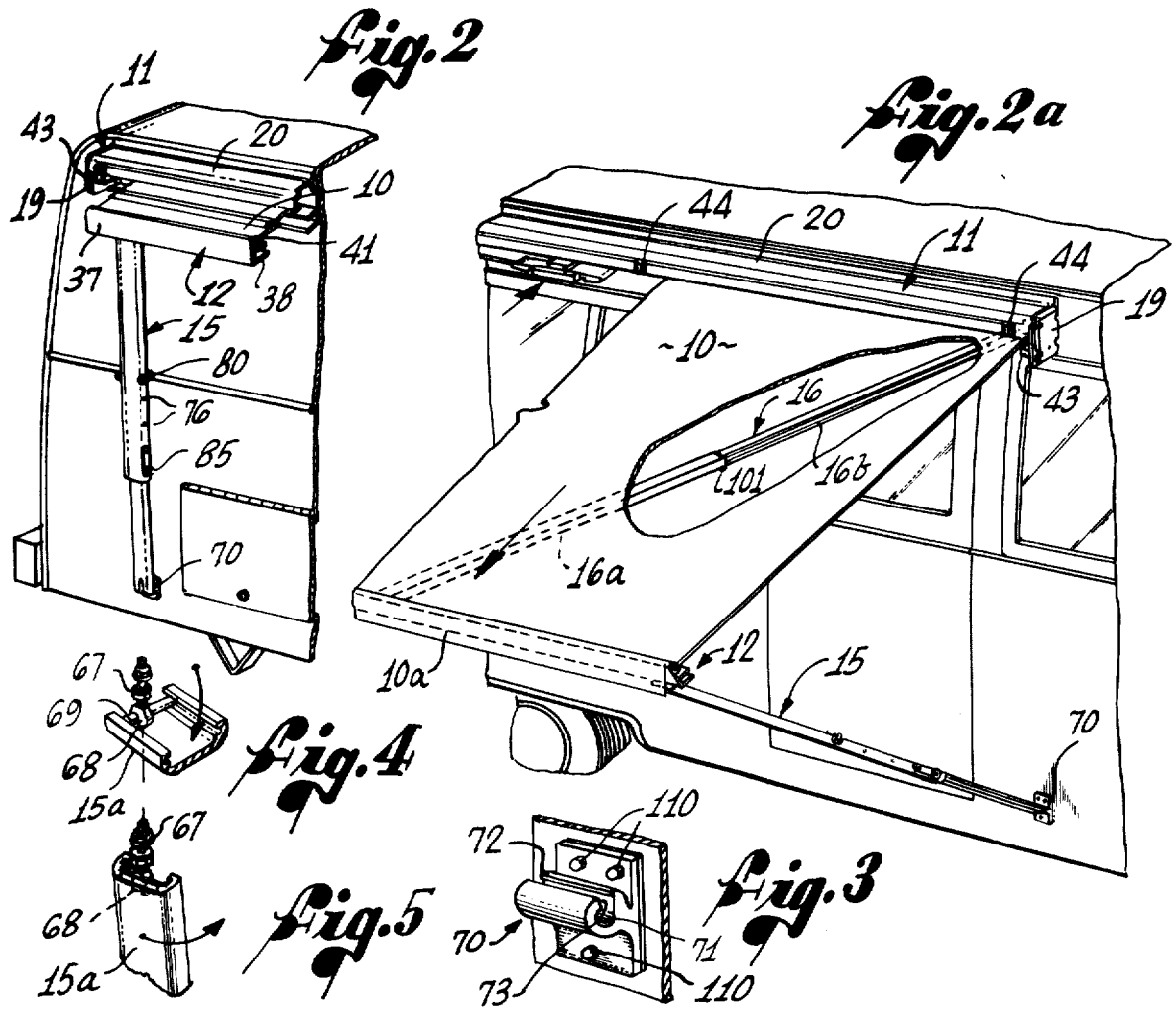

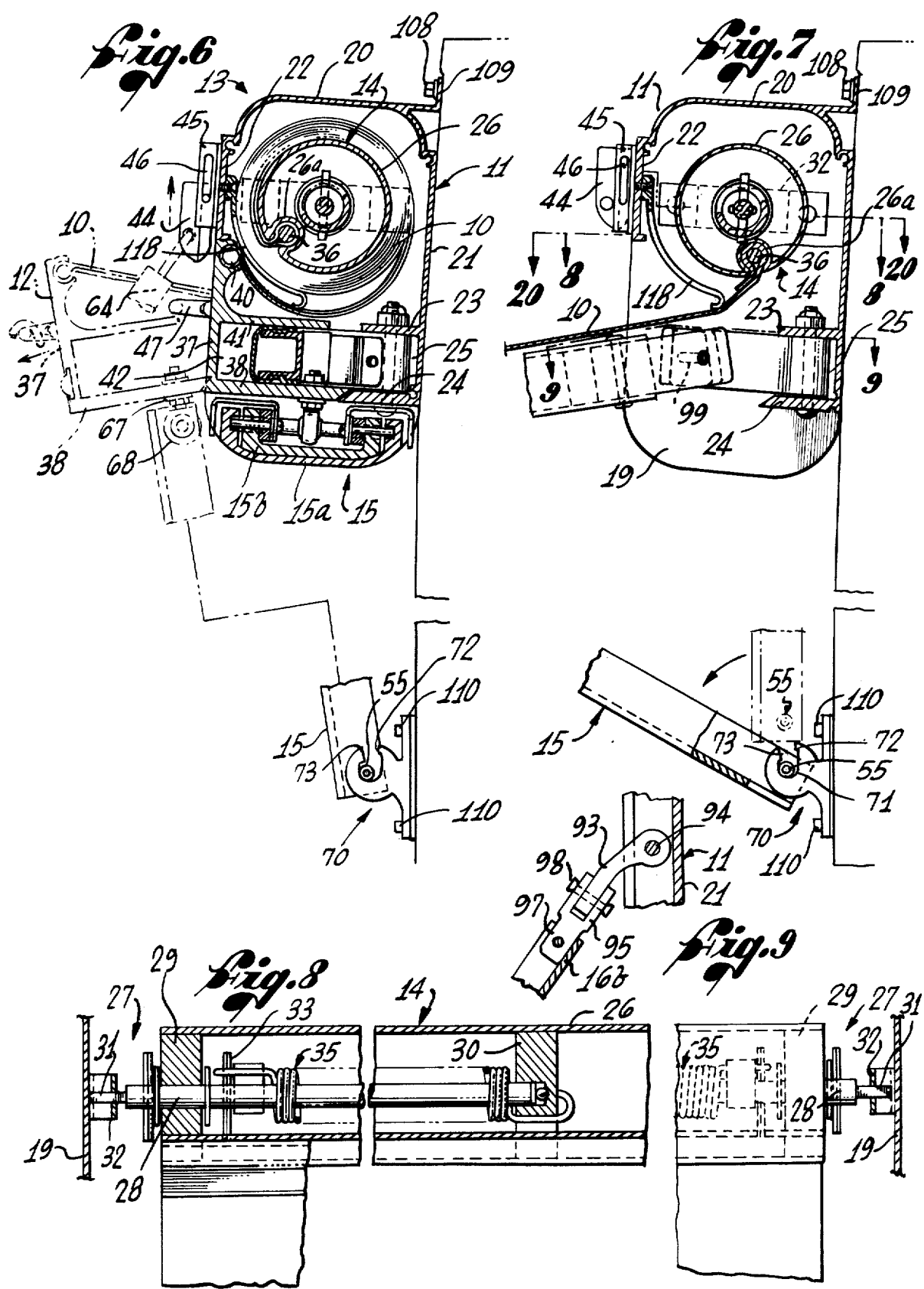

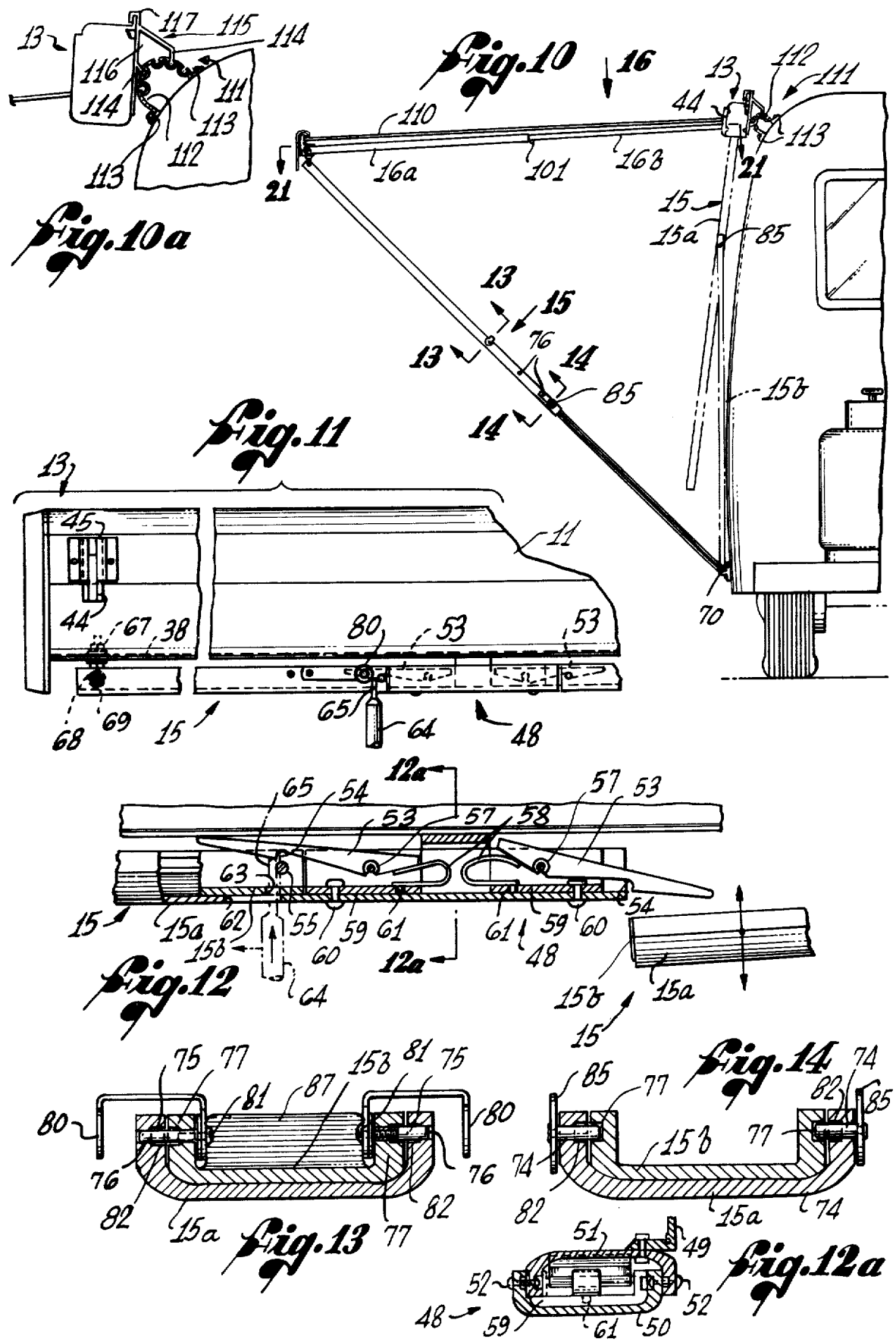

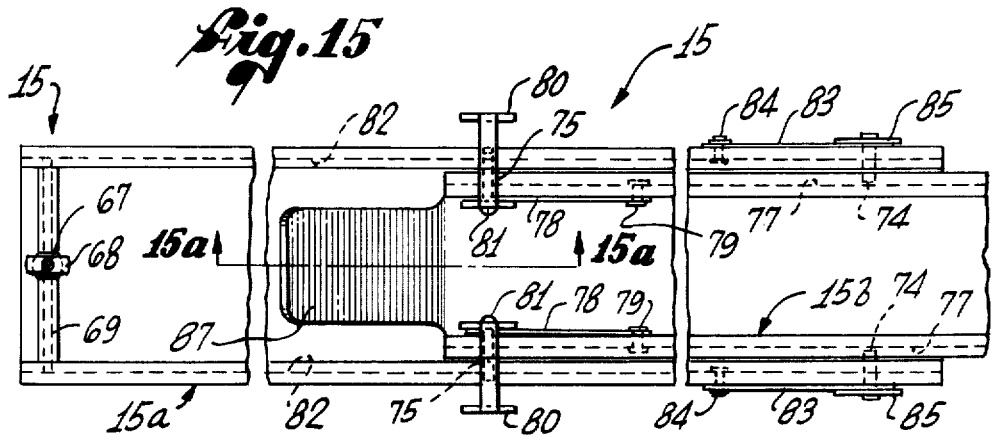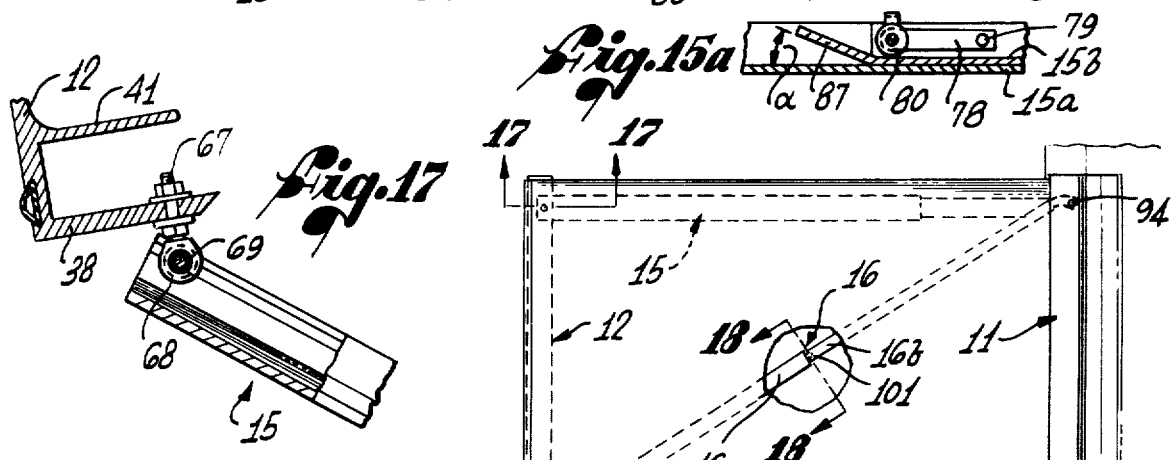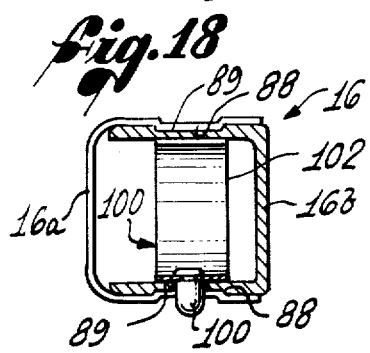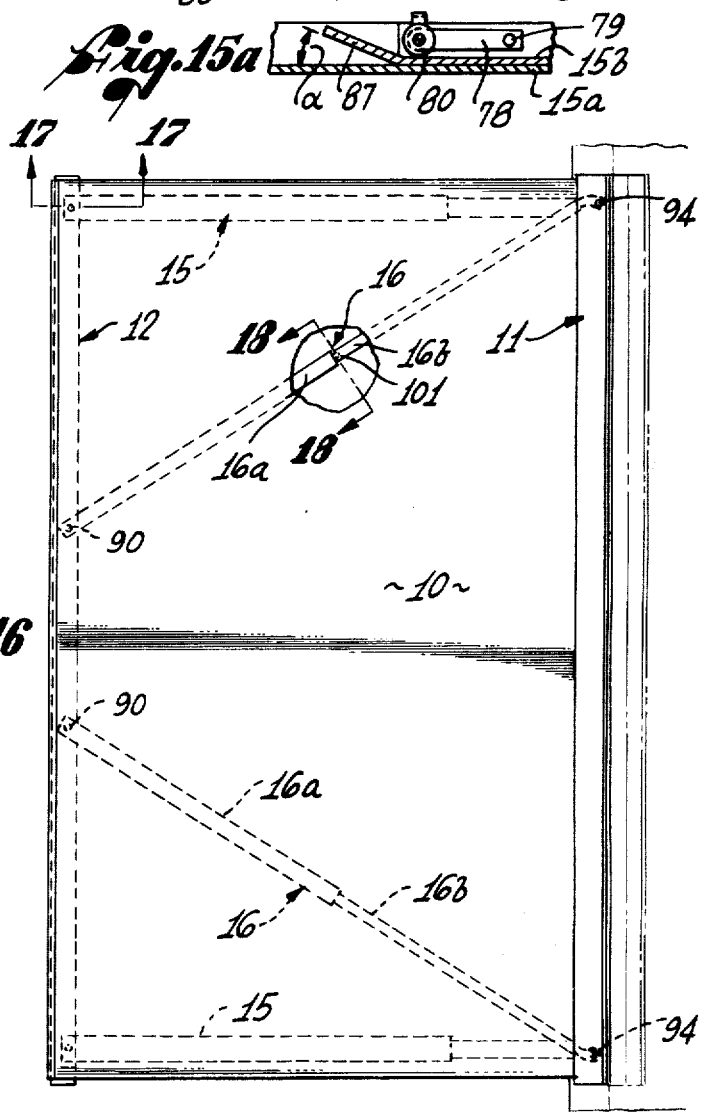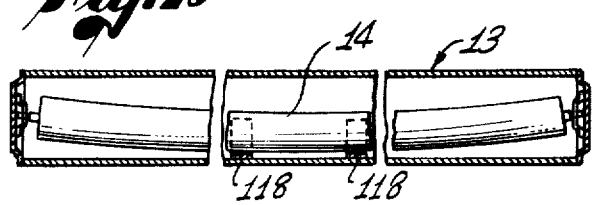

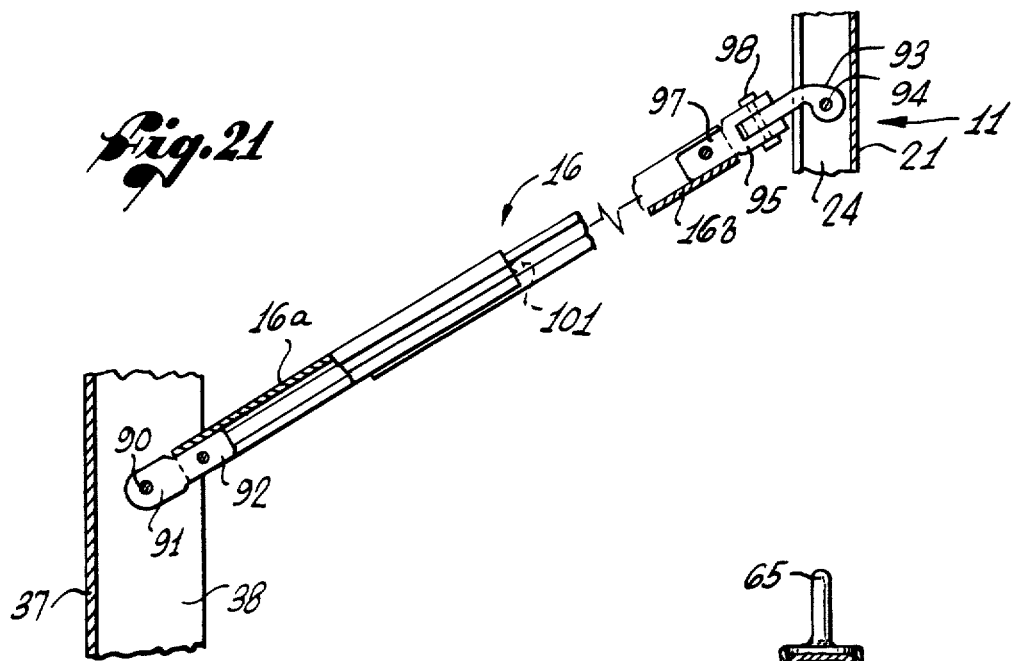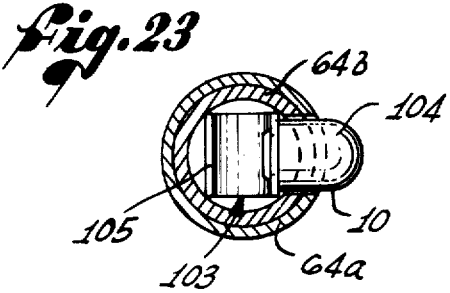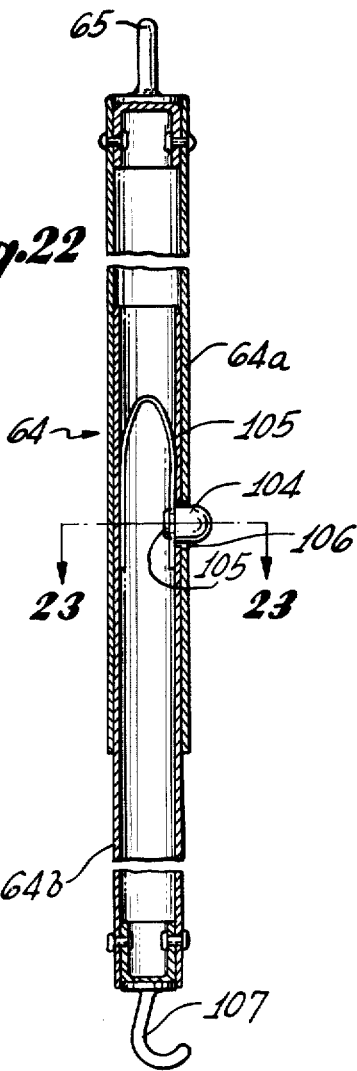

RETRACTABLE AWNING ASSEMBLY

RELATED APPLICATION

This application is a continuation-in-part of application Ser. No. 705,873, filed July 16, 1976, entitled RETRACTABLE AWNING ASSEMBLY.

BACKGROUND OF THE INVENTION

The present invention relates to awnings and, more particularly, to retractable, self-storing awning assemblies including housings or cases for attachment to recreational vehicles and the like.

There are a variety of known self-storing awning assemblies that provide a sheltered area when in an extended position but can be retracted into the housing or case for storage. While these awnings have been used advantageously in a wide variety of environments, they are particularly suitable for use with recreational vehicles to provide a covered outdoor area that is sheltered from the sun and inclement weather.

Known awning assemblies of the above type employ housings that are mounted on the sides of recreational vehicles to store the awnings in rolled condition when not in use. In one such prior assembly, shown in Railson U.S. Pat. No. 3,364,973, the awning is stored on a take-up roller that is rotatably mounted in a case having a side door through which the awning can be extended from the case by pulling lead bar to which the outer edge of the awning is connected. Bracing legs are stored in the case in folded positions along side the lead bar, and are unfolded for movement into bracing engagement with the case.

Another prior awning of this general type is shown in McKee U.S. Pat. No. 3,923,074. This is generally similar to the Railson awning, except that the take-up roller is mounted on the lead bar to move into and out of the case as the awning is retracted and extended, the inner edge of the awning being fixed in the case. McKee used primary and secondary bracing legs at both ends of the lead bar to hold it in the extended position, and to be folded alongside the outer member and into the case for storage.

While known awning assemblies have been generally satisfactory in relatively small sizes, a number of problems can become very troublesome if the size is increased beyond certain limits. When the awning is made relatively long, the size and strength of the lead bar must be increased considerably if sagging and buckling are to be avoided. The housing must then be increased in size to contain the lead bar when the awning is retracted, and the stored assembly becomes unacceptably heavy and cumbersome, interfering with the streamlined appearance and air flow characteristics of the vehicle. Because of these problems, awning assemblies in cases have not been provided in long lengths.

One of the more serious problems of larger awnings is the difficulty of erecting them, particularly for one person. Manipulation of the lead bar and the unfolding, positioning, and refolding of the bracing legs are difficult operations even with shorter awnings of the Railson or McKee types, and become very difficult in larger sizes. Moreover, the conventional approach to storage of these legs, alongside the lead bar and inside the case, increases the difficulties of handling of the lead bar and the size of the case necessary to hold the stored parts.

A special problem exists with recreational vehicles having convexly curved outer sides. While it is desirable to attach the bracing legs to the vehicle before extending the awning, any substantial curvature between the case and the leg brackets will prevent this. Thus, the use of such awning assemblies on curved-sided vehicles has been limited.

A principal objective of the present invention is to provide an awning assembly for use on recreational vehicles that overcomes the above disadvantages of previously known assemblies, and constitutes a significantly improved assembly in this field.

SUMMARY OF THE INVENTION

The present invention relates to an awning assembly of the foregoing character that has sufficient support and rigidity to be used in larger sizes, without undue weight and bulk, and also can be operated with ease by a single person, both in larger sizes and in presently conventional sizes. It is compact and relatively lightweight, and presents a more streamlined appearance when in its retracted stored position. Other advantages are the reduction of wind resistance and its suitability for use with vehicles having curved sides.

More specifically the improved awning assembly includes a case to be attached to the vehicle, and a lead bar that forms a part of the sidewall of the case in the stored condition of the awning assembly, thereby reducing the required interior space, the overall size of the assembly in its retracted position, and the difficulty of extending the lead bar away from the case. In addition, the bracing legs are swivelly attached to the lead bar for movement from stored positions beneath the lead bar, outside the case, first downwardly to ready positions engaged with brackets on the side of the vehicle, and then outwardly as the awning is extended. These legs are securely and inconspicuously held in the stored positions by a leg latch on the underside of the case, which not only latches the legs in place but also integrates the stored legs into the lines of the case, despite their outside storage. The legs preferably are of flat, generally rectangular cross-sectional shape for relatively high strength and for compactness in the stored condition.

Additional support for the lead bar is provided by automatically extended rafters that project outwardly from the case to intermediate portions of lead bar. These rafters prevent excessive inward bowing of the lead bar and sagging of the awning between the case and the lead bar, are shifted quickly and easily into and out of their extended position as an incident to the extension and retraction of the awning, and are stored compactly in the case when the assembly is retracted.

To facilitate use on a vehicle with curved sides, the bracing legs, which are telescopically extendable, also have pivotal, knee-like joints permitting them to "break" outwardly to a limited degree to extend around the curved sides for attachment to the leg brackets before the awning has been unrolled. Then, after the awning is extended, the legs can be straightened and latched in the straightened position. Special universal mounting brackets are provided to facilitate the attachment of the case to a curved surface.

The leg latch which supports the legs in their traveling position is disposed between the free ends of the two legs, and preferably is of the same cross-sectional shape to appear to be a continuation of the legs. This latch has pivotable latch plates that are accessible through openings in the legs to be released from their leg-engaging positions, thus freeing the legs to be swung downwardly and rotated into position for engagement with the brackets on the vehicle.

Other features and advantages of the present invention, including more detailed aspects of the case, the lead bar, the rafters, the leg latch, and the legs, will become apparent from the following detailed description, taken in conjunction with the accompanying drawings, which illustrate, by way of example, the principles of the invention.

BRIEF DESCRIPTION OF THE DRAWINGS

FIG. 1 is a perspective view of an exemplary awning assembly contructed in accordance with the present invention, along with a portion of a recreational vehicle to which it is attached, the awning assembly being shown in the retracted position;

FIG. 2 is a slightly enlarged perspective view similar to part of FIG. 1 and showing one end portion of the awning assembly in a partially extended position;

FIG. 2a is a perspective view similar to FIG. 2 showing the opposite end portion of the awning assembly in a fully extended position, a portion of the awning being cut away to expose a portion of one of its rafters;

FIG. 3 is an enlarged perspective view of a leg bracket by which a leg of the awning assembly is releasably secured to the side of the vehicle;

FIGS. 4 and 5 are enlarged perspective view of the upper end portion of a leg and the components by which it is connected to the lead bar, the leg being shown in its horizontal storage position in FIG. 4 and its vertical position in FIG. 5;

FIG. 6 is an enlarged cross-sectional view taken through the awning assembly along line 6—6 of FIG. 1, showing the awning assembly in full lines in the fully retracted position, and illustrating the partially extended position of FIG. 2 in broken lines;

FIG. 7 is a fragmentary cross-sectional view similar to FIG. 6, with parts in moved positions illustrating the extended position;

FIG. 8 is a fragmentary view, partially in cross-section and partially in side elevation, taken substantially along line 8—8 of FIG. 7, and partially broken away for compactness;

FIG. 9 is a fragmentary cross-sectional view taken substantially along line 9—9 of FIG. 7 and showing the connection of a rafter to the case;

FIG. 10 is a fragmentary end elevational view showing the awning assembly in its fully extended position on a curved-sided vehicle, with the "broken" position of a leg shown in dot-dash lines, the awning assembly being the same as in the other figures except for its mounting bracket and the shape of the vehicle on which it is mounted;

FIG. 10a is an enlarged fragmentary end view of part of the awning assembly in FIG. 10;

FIG. 11 is an enlarged fragmentary side elevational view of one end portion of the awning assembly, shown in its fully retracted position and also showing a tool used to release the legs from the leg latch;

FIG. 12 is an enlarged fragmentary view, partially in cross-section, of the leg latch and the adjacent end portions of the legs, showing one leg in its traveling position and the other leg released and moved away from the leg latch, the position of the releasing tool being shown in dot-dash lines;

FIG. 12a is a cross-sectional view taken substantially along the line 12ª—12ª of FIG. 12;

FIG. 13 is an enlarged cross-sectional view taken substantially along the line 13—13 of FIG. 10;

FIG. 14 is an enlarged cross-sectional view taken substantially along the line 14—14 of FIG. 10;

FIG. 15 is an enlarged top view taken in the direction of the arrow 15 in FIG. 10, with parts removed for compactness;

FIG. 15a is a fragmentary cross-sectional view taken substantially alone line 15ª—15ª of FIG. 15;

FIG. 16 is a plan view of the awning assembly taken in the direction of the arrow 16 of FIG. 10, a portion of the awning being broken away to expose part of a rafter;

FIG. 17 is an enlarged fragmentary cross-sectional view taken substantially along line 17—17 of FIG. 16;

FIG. 18 is an enlarged cross-sectional view taken along line 18—18 of FIG. 16;

FIG. 19 is a perspective view of a spring and detent used to secure the rafter releasably in an extended position;

FIG. 20 is a diagrammatic cross-sectional view taken longitudinally through the case, generally along the line 20—20 of FIG. 7 with parts removed for compactness, in which the bow of the take-up roller is exaggerated for purposes of illustration;

FIG. 21 is an enlarged fragmentary view, partly in side elevation and partly in cross-section, taken substantially along line 21—21 of FIG. 10;

FIG. 22 is an enlarged cross-sectional view, taken longitudinally through an operating tool suitable for use with the awning assembly, as partially shown in FIG. 11; and FIG. 23 is an enlarged cross-sectional view taken along line 23—23 of FIG. 22.

DETAILED DESCRIPTION

An exemplary self-storing awning assembly embodying the novel aspects of the present invention is illustrated in FIGS. 1-21 of the accompanying drawings. In general, it comprises an awning 10, an open-sided structure 11 constituting the body of a case, a lead bar 12 that combines with the case body to form an enclosed case 13 (FIGS. 1 and 6), a take-up roller 14 for rolling up the awning, a pair of legs 15 that are pivotally connected to the ends of the lead bar for movement from storage positions under the case to operating positions in which they support and brace the lead bar when the awning is extended, and a pair of automatically extendable and retractable rafters 16 that brace the lead bar in the extended position. These basic components and their features and operation will be described more fully in the following detailed description.

The awning assembly is particularly suitable for attachment to the side of a recreational vehicle 17, as shown in FIG. 1, with the case 13 secured in a horizontal position near the top of the sidewall 18. As best shown in FIGS. 2a, 6 and 7, the case body 11 forms a partial enclosure having an elongated configuration, and preferably is constructed of aluminum, having two end plates 19 that are generally rectangular with rounded corners, a top wall 20, a back wall 21, and a front lip 22 extending downwardly from the front edge of the top wall (FIGS. 6 and 7). Two parallel horizontal flanges 23 and 24 extend forwardly from the interior surface of the back wall to form an outwardly opening longitudinal channel 25 that is positioned above the lower edges of the end plates 19. It will be seen that the entire case body, except the end plates, can conveniently be a one-piece aluminum extrusion.

The awning 10, which is a rectangular sheet of flexible material, is rolled up on the take-up roller 14 when not in use. This roller is an elongated, hollow cylindrical drum 26 that extends substantially the full length of the case 13 and is mounted in the case for rotation about its longitudinal axis by two spring-loaded roller-supporting mechanisms 27 (see FIG. 8) that are provided at the ends of the drum. These mechanisms support the take-up roller and urge it in one direction about its axis, so as to wind up the awning as it is retracted, and also to apply tension to the awning when it is extended.

As shown most clearly in FIG. 8, each spring mechanism 27 includes a fixed horizontal axle 28 that extends into the adjacent end portion of the roller drum through an end plug 29 in the roller, and also extends into a second plug 30 in the roller, spaced from the end thereof. These plugs are tightly fitted in the roller, but are free to turn on the axles 28. At its outer end, beyond the end of the roller, each axle has a flat-sided end portion 31 that is non-rotatably received in a bracket 32 that supports the axle and prevents it from rotating. The brackets 32 are attached to the end plates 19 of the case body 11.

Acting between the take-up roller 14 and the axles 28 to urge the roller yieldably in one direction is a pair of coiled torsion springs 35, each spring being fitted over the axle between the two plugs 29 and 30 and anchored at one end to the inner plug 30 and at the other end to a pin 33 that is fixed in the axle. Thus, as the roller is turned in one direction during unrolling of the awning, the springs are wound up and stressed, thereafter urging the roller back in a direction to wind up the awning.

To attach the awning 10 to the take-up roller 14, an elongated groove with a restricted open side is formed in the roller drum, to receive an enlarged bead 36 along the inner edge of the awning. Herein, the roller drum 26 is an elongated extrusion and the groove is an integral, part-cylindrical internal rib 26a in the drum, while the bead 36 is a loop of the awning material that is sewn around an elongated dowel pin, as shown in FIGS. 6 and 7. With this arrangement, the bead can be inserted into the groove from the end of the drum, with the awning extending out of the groove, and thereafter is securely held in place against pulling out of the groove. A short flap or valence 10a (FIGS. 2a and 10) preferably is provided to drape downwardly from the outer end of the awning 10.

The lead bar 12, shown in its retracted position in FIGS. 1 and 6, combines with the case body 11 in forming a completely enclosed case or housing 13 for the awning when the latter is in its rolled up, retracted condition, the lead bar forming the lower portion of the front wall and the front portion of the bottom wall of the case. As can be seen in FIGS. 2 and 6, the lead bar comprises an upright and substantially flat front wall 37, below and in the plane of the lip 22 of the case body, and a generally horizontal bottom wall 38 extending from the lower edge of the front wall toward the back wall 21 of the case body, in the same plane as the lower flange 24 on the back wall. The bottom wall 38 terminates in a beveled edge that fits against and over a reversely beveled edge of the lower flange 24.

The awning 10 is connected to the lead bar 12 by means of a bead 40 (FIG. 6), formed by a dowel pin that is sewn onto the outer edge of the awning and slipped endwise into a restricted groove formed on the inner side of the front wall 37, adjacent the upper edge thereof. This completes the case, except for a horizontal flange 41 which extends rearwardly from the front wall 37, above and parallel to the bottom wall 38. This flange is level with the rear flange 23, and defines a rearwardly opening channel 42 which faces toward and is aligned with the channel 25 along the back wall of the case body. Thus, the two flanges 41 and 24 partition the case into an upper chamber in which the awning 10 is stored on the take-up roller, and a lower chamber. The rafters 16 are mounted and stored in the lower chamber.

To hold the lead bar 21 firmly in place in the retracted position of the awning assembly, wedge-like positioning members 43 (see FIGS. 2 and 2a) are positioned in the case body 11 to fit tightly but slidably in the lead bar channel 42, thereby supporting the lead bar securely on the case. As can be seen in FIGS. 2 and 2a, these members are simply loop-like metal bands that have tapered front ends for smoothly entering the lead bar channel as the latter is moved into its storage position, the central portion of the band fitting snugly against the flanges 38 and 41. One such positioning device is shown on the inner side of each end plate 19, and another may be provided to support the central portion of the lead bar.

In addition, manually operable latches 44 are provided on the case to prevent accidental displacement of the lead bar 12 from the case body 11. As shown in FIGS. 6 and 7, these latches are formed by simple plungers that are slidably mounted on brackets 45 that are fastened to the front lip 22 of the case body, the plungers and brackets having pin-and-slot connections 46, and each plunger preferably having a hole that is accessible by an operating tool, as shown in broken lines in FIG. 6. Preferably, one such latch 44 is provided near each end of the lead bar, and one in the middle, and the plungers slide on the brackets with frictional resistance that holds the plungers releasably in selected positions. A U-shaped handle or pull 47 (FIGS. 1 and 6) is provided at the center of the lead bar.

As shown in FIGS. 1, 6 and 11, the legs 15 are stored inconspicuously in generally horizontal positions along the underside of the case 13, in a manner that causes them to blend into the case for a compact, streamlined appearance. In general, this is accomplished by masking the legs with the end plates 19 at the ends of the case, matching the outside contour of the legs beneath the case to the contour of the top wall 20 of the case, and filling the space between the adjacent ends of the legs with a leg latch housing 48 which provides an appearance of longitudinal continuity along the full length of the case.

As can be seen in FIGS. 6 and 11, the cross-sectional shape of the legs 15 is flattened and generally rectangular, for a contour similar to the contour of the top wall 20. As can be seen in FIG. 7, the lower portions of the end plates 19 are similarly shaped, and the corresponding shape of the leg latch housing 48 can be seen in FIGS. 1 and 12a. Accordingly, the legs, although advantageously stored outside the case, complement the external appearance of the awning assembly. In addition, of course, the flattened cross-sectional shape of the legs provides otpimum strength for the thickness of the legs.

The leg latch 48 is bolted to the underside of the case, and preferably comprises a short section 50 of shallow extruded aluminum channel that is used for the outer sections 15a the legs 15 (to be described in more detail herein after). This section is supported in alignment with the stored positions of the legs, in the upwardly opening position shown in FIG. 12, and as a matter of manufacturing convenience is supported on a second such section 51 that is fastened in an inverted position to the Flange 24 and riveted, as shown at 52, to the lower section.

Pivotally supported in the hollow, open-ended housing thus formed are two latch plates 53 (see FIG. 12) that have free end portions which project in opposite directions out of the housing. Shaped lower surfaces on the latch plates provide latching shoulders 54 facing toward the housing, to latch around pins 55 in the ends of the legs. The latch plates are fulcrumed on pins 57 spanning the sidewalls of the housing, and are spring-loaded in a direction to swing the free ends downwardly, herein by C-shaped spring strips 58 that are confined and stressed between the inner end portions of the latch plates and narrow plates 59 that are riveted at 60 (FIG. 12) to the bottom wall of the housing. Small pins 61 on the spring clips are fitted in holes in the plates 59 to retain the clips in the housing.

In the normal travel and storage condition of the legs 15, shown in FIGS. 1 and 11, the free end of each leg is beside one end of the leg latch housing 48, and a telescoping inner section 15b of the leg is inserted in the leg latch housing, as can be seen most clearly on the left in FIG. 12. The latch plate 53 is fitted over the pin 55, which is mounted on the inner section, so as to retain the inner section longitudinally in place, against accidentally sliding out. As will appear hereinafter, the outer sections of the legs are held up by the inner sections. For access to the latch plates, an elongated notch 62 is formed in each outer leg section in alignment with a hole 63 in the inner leg section, the hole 63 preferably being close to the end of the leg latch housing.

To release the legs 15 preparatory to extending the awning 10, the latch plates 53 are raised to release the pins 55, and the inner sections 15b are slid out of the housing 48. While various tools can be used for this purpose, a special tool 64 preferably is provided, as shown in FIGS. 11, 12, 22 and 23. This tool carries a probe-like pin 65 that is sized for insertion through the notches 62 and the aligned holes 63 into engagement with the latch plates, to lift the latter away from the pins 55, as shown on the left in FIG. 12. While the latch plate is raised, the pin 55 is moved away from the leg latch housing, longitudinally of the leg, to shift the inner leg section 15b out of the housing and move the pin 55 away from the latch shoulder. This releases the legs for movement to their operative positions.

The legs 15 are attached to the ends of the lead bar 12 for both turning and pivotal motion between the generally horizontal, stored positions and upright operating positions for connection to the side of the vehicle beneath the case 13, and also are telescopically extendable and contractable. The turning and pivotal connections are shown most clearly in FIGS. 4, 5, 6 and 11 and comprise swivel bolts 67 that extend through the bottom wall 38 of the lead bar 12, and are held in place by nuts as shown in FIG. 6. Ball-and-socket joints 68 on the lower ends of the swivel bolts connect the latter rotatably to the legs 15. The socket of each such joint is a collar that is open on two sides and encircles a ball that is rotatably confined in the collar, the ball being mounted on a pin 69 that is fastened to the leg 15 adjacent its upper end. Thus, each leg can be swung down to an upright position about the pivotal axis defined by the ball-and-socket joint, and then turned about the longitudinal axis defined by the swivel bolt, so that its wide inner side faces toward the vehicle.

With the legs 15 in this attitude, their lower ends are attached to leg brackets 70 positioned on the vehicle 17 below the case 13, as shown in FIGS. 1, 2 and 2a, the details of the brackets being seen most clearly in FIGS. 3, 6 and 7. As shown in FIG. 7, the pins 55 on the ends of the legs are inserted downwardly into upwardly opening notches 71 in the upper sides of the brackets, and thereafter are releasably and rotatably confined in the notches by opposed, overhanging shoulders 72 and 73 defining the entry into the groove. These shoulders resist accidental disengagement of the pins, especially while under the weight of the awning, and generally require intentional manipulation of the legs to remove the pins from the brackets.

The two leg sections 15a and 15b that form each leg 15 are nested and joined together for longitudinal sliding relative to each other between a fully contracted storage condition (FIG. 1) and a plurality of different extended lengths. In this instance, the leg sections are relatively flat and channel-like in shape, each having a closed, relatively wide side, two relatively narrow edge walls, and an open side. The inner leg section 15b is made smaller in cross-section than the outer leg section, so as to nest slidably in the channel of the outer leg section, but is only slightly shorter than the outer leg section. The ends of its edge walls are flush with the ends of the edge walls of the outer leg section.

To couple the inner and outer leg sections together, two sets of pins 74 and 75 (see FIGS. 10, 13 and 14) are provided, one set 74 being carried on the outer leg section and the other set 75 being carried on the inner section. These pins are mounted in bores in the side edges of the respective leg members, and project through the bores into the other leg section. The pins 75 carried on the inner leg section project outwardly into one of a plurality of sets of bores forming adjustment holes 76 in the outer leg section (FIG. 13), and the pins 74 carried by the outer leg section project inwardly into longitudinal grooves 77 in the inner leg section (FIG. 14).

The pins 75 on the inner leg section 15b are urged outwardly into engagement with the adjustment holes 76 by means of resilient spring strips 78 (see FIG. 15) that are riveted at 79 to the side edges of the inner leg section, inside its channel, and normally are disposed against the side edges of the inner channel, with the pins engaged in the holes 76, as shown in FIG. 13. To release the inner leg member for sliding, U-shaped leg-release push-buttons 80 are attached to the spring strips 78 near their free ends, for example, by screws 81 (FIG. 13) extending into the detent pins, and manually engageable tabs forming the push-buttons are disposed on opposite sides of each leg. When the two push-buttons 80 are squeezed together, the pins 75 are disengaged from the adjustment holes 76, and can be slid along the outer leg section to a new set of holes, thereby changing the length of the leg. Preferably, a groove 82 is formed along the inner side of each outer edge wall to reduce the amount of movement required for pin disengagement, and to guide the pins from one set of adjustment holes to the next. During such movement, the other pins 74 simply slide along the grooves 77 in the edge walls of the inner channel, these grooves having no detent holes.

The second set of pins 74 in each leg permits the leg to be converted from a longitudinally stiff leg to a jointed leg, with a knee-like joint between the inner and outer leg sections 15a and 15b to facilitate erection of the awning when it is mounted on a curved-sided vehicle, as shown in FIG. 10. With such joints, the legs can extend outwardly from the case 13 around the curvature of the vehicle, and then back in to the leg brackets 70 on the lower portion of the vehicle side, for coupling to the brackets before the awning 10 is extended.

To permit such jointed action, the pins 74 carried by the outer leg sections 15a are disengageable from the grooves 77 in the inner leg sections 15b, to permit the latter to swing out of the channels in the outer leg sections, while remaining pivotally connected by the other pins 75. For this purpose, the pins 74 are carried by resilient spring strips 83 (see FIG. 15) that are riveted at 84 to the outer sides of the outer leg sections, and thus are yieldable outwardly to withdraw the pins from the grooves. Manipulation of these pins is facilitated by two discs 85 that are fastened to the free ends of the spring strips.

When the pins 74 are pulled out of the grooves 77, using the discs 85 as grips, the inner leg section can be pivoted about the pins 75, to the position shown in dot-dash lines in FIG. 10, so that the leg 15 will clear the curvature of the side of the vehicle. The pivoting preferably is limited by a tongue 87 on the end of the inner leg member (see FIG. 15a), to a total angular movement indicated by the arc a in FIG. 15a. This swing-limiting tongue assists the operator in maintaining control of the leg while the pins 74 are disengaged.

As shown most clearly in FIGs. 2a, 10 and 16, the rafters 16 for bracing the lead bar 12 when the awning 10 is extended are connected to the case body 11 near its opposite ends, and to the central portion of the lead bar at intermediate points on opposite sides of its longitudinal midpoint. Each rafter comprises two elongated telescoping struts 16 and 16b, herein of U-shaped cross-section as shown in FIGS. 6 and 18, the outer strut having two longitudinal internal ribs 88 that interfit with, and slide in, similarly shaped grooves 89 in the inner strut to hold the two struts slidably together.

The outer ends of the outer struts 16a extend into the lead bar channel 42 and are pivotally connected to the flanges 38 and 41 by hinge pins 90 (see FIG. 21) that extend through tabs 91 on fittings 92 that are pinned into the outer ends. The projecting ends of the inner struts 16b are pivotally connected to the case body 11 by means of hinge arms 93 (see FIGs. 7, 9 and 21). These arms are disposed in the inner channel 25 and are pivoted on hinge pins 94 in the form of bolts mounted between the flanges 23 and 24, so that the hinge arms can swing into and out of the channel 25. A yoke 95 on a plug 97 that is pinned in the adjacent end of the inner strut straddles the free end portion of the hinge arm and is pivotally joined thereto by a pin 98 that is slidable along a slot 99 in the hinge arm. Thus, the hinge pin 94 defines a generally vertical axis for the principal swinging of the rafter, and the pin 98 defines a generally horizontal, sliding axis for accommodating tilting of the rafter as the lead bar is extended and lowered relative to the case body.

It will be seen in FIG. 6 that, when the awning is retracted, the rafters 16 are disposed in the lower chamber of the case 13 defined by the two channels 42 and 25. As the lead bar 12 is pulled away from the case body 11, the outer ends of the rafters move out with the lead bar, causing the rafters to extend longitudinally while simultaneously swinging outwardly about the hinge pins 94, and tilting downwardly about the pins 98 as the lead bar is lowered.

When the awning 10 has been extended to the full extent desired, the rafters 16 are in the positions shown in FIGS. 2a and 16, with the inner struts 16b still extending a substantial distance into the outer struts 16a. Detent devices 100 (FIGS. 18 and 19) are provided in the overlapping portions of the rafters to latch them releasably in the extended condition. Herein these devices comprise spring-loaded detent pins 101 that are carried inside the inner struts on C-shaped spring clips 102 and are positioned in holes in the inner struts. When the rafters reach the extended positions, the ends of the outer sections 16a pass the pins and permit them to snap out, thereafter blocking reverse sliding of the outer struts. Release of the struts for telescopic contraction is accomplished simply by pressing the pins 101 in far enough to permit the outer struts to slide over the pins.

In addition to the support provided by the rafters 16, any tendency of the awning 10 to sag is resisted by the spring-tension applied by the take-up roller 14. For the same reasons that the lead bar 12 tends to bow, without the rafters 16, the take-up roller also tends to bow. This bowing is limited, however, by two arcuate drum supports 118, shown in FIGS. 6 and 7, and diagrammatically in FIG. 20.

Each of these supports is attached at its upper end to the lip 22 of the case body 11, and curves downwardly and partially under the roller 14, as shown in FIGS. 6 and 7, having a curl 119 on its lower end around which the awning 10 slides during extension and retraction.

When the take-up roller 14 is urged forwardly by the weight and tension of the extended awning structure, it will bow forwardly to a limited extent, as shown in exaggerated fashion in FIG. 20. Upon engagement with the supports 118, however, further bowing is prevented, and further awning sag is eliminated.

Shown in FIGS. 22 and 23, and in part in other figures of the drawings, is the preferred operating tool 64 for manipulation of the awning assembly during extension and retraction. This tool is of a type that may be called a "wand", and comprises an elongated, extendable body formed by two telescoping tubes 64a and 64b with a spring detent device 103 permitting adjustment of the length. This device comprises a detent pin 104 on a spring strip 105, engageable with a plurality of sets of holes 106 spaced along the body. The probe-like pin 65 is mounted on one end, and a hook 107 is mounted on the other end. The probe pin 65 is useful in unlatching the lead bar 12 and releasing the legs 15, as previously described, and the hook can be used to grip the handle 47 and pull the lead bar 12 away from the case body 11.

When the awning assembly is to be mounted on a substantially flat-sided vehicle 17, screws, as shown at 108 in FIGS. 6 and 7, can be inserted through a lip 109 extending along the top of the case body 11, and driven into structural members (not shown) of the vehicle, such as studs or roof stringers. The leg brackets 70 are similarly attached, as by screws 110. Care should be exercised, of course, to position the awning assembly so as not to interfere with other components of the vehicle.

When the awning assembly is to be mounted on a vehicle with a substantial curvature at the roof line, as illustrated generally in FIGS. 10 and 10a, special mounting brackets 111 should be used, to provide a substantially vertical base for the case 13. The illustrative bracket 111 is an arcuate band 112 having end tabs 113 through which suitable fasteners extend into the body of the vehicle. The tabs form feet that are engageable with the curved wall in the manner shown. Spaced around the arcuate band are a series of angularly spaced mounting grooves for receiving mounting studs 114 on a second fitting 115 to which the case can be attached. This fitting has two legs carrying the studs 114 that are angularly positioned to fit into any two of the grooves that are separated by one groove.

Thus, in a variety of positions of the mounting bracket 111 on the curved roof line, two of the fittings 115 can be positioned to support the case 13 securely in a substantially upright position, with its back wall against flat back strips 116 of the fittings, and its lip 109 inside inverted grooves 117 the upper ends of the back strips and secured therein by suitable bolts (not shown).

When the awning assembly is to be extended, beginning in the fully retracted, travel condition shown in FIGS. 1 and 6, the first step is to release one of the legs 15 by inserting the probe finger 65 through a notch 62 and a hole 63 in the leg, lifting the latch plate 53 and sliding the inner leg section 15b out of the leg latch housing 48. Then the leg is lowered away from the case 13, and the pin 55 is placed in the leg bracket 70.

After this simple procedure has been repeated with the other leg, the tool 64 is used to raise the latch plungers 44 out of their blocking positions, and to pull the lead bar 12 out of the case body 11, using the hook 107 of the tool. This automatically extends the rafters 16.

When the awning 10 reaches the extended position, the detent pins 101 snap out into their extended positions, blocking contraction of the rafters 16, the valence 10a is unfolded, and all that remains is adjustment of the awning to the desired height. For this purpose, the push-button leg locks 80 are depressed to allow the outer leg sections 15a to slide on the inner leg sections 15b until the legs are of the desired length. When the push-buttons are released and the pins 75 are re-engaged in the selected adjustment holes 76, the awning erection is complete.

The procedure is the same when the awning is installed on a curved-sided vehicle, as in FIG. 10, with the addition of a step of "breaking" each leg 15 preparatory to engaging it in the leg bracket 70. This is accomplished by spreading the discs 85 and pulling the pins 74 out of engagement with the inner leg sections, and swinging the latter into the angular position shown in broken lines in FIG. 10, as limited by the tongues 87. Then the pins 55 can be engaged in the brackets 70, after which the awning 10 is extended, as before. When the lead bar 12 is spaced from the vehicle, the legs 15 can be returned to their straight conditions, with the pins 74 re-engaged in the grooves 77, and the height of the awning is adjusted, as before.

Retraction of the awning 10 is an equally simple operation, performed by reversing the extending steps. In each direction, the operation can be performed quickly and easily by a single person, using only the tool 64 to facilitate access to the case 13 and its parts.

From the foregoing, it should be evident that the present invention provides an effective and easily operated awning assembly, capable of being constructed in relatively long lengths without many of the disadvantages of prior awning assemblies of this general type. Moreover, the unique case design, with the lead bar 12 doubling as a door, and with the flattened legs 15 stored inconspicuously along the underside of the case and blending into the design thereof, produces an aesthetically pleasing, as well as highly functional, end product.

It also will be apparent that, while a particular embodiment has been illustrated and described, various modifications and changes may be made without departing from the spirit and scope of the invention.

I claim:

1. An awning assembly comprising:

an elongated case body having top and back walls, a partial front wall extending downward from the front of said top wall, a partial bottom wall extending forward from the bottom of said back wall, and end plates closing the ends of the body;

said case body having an opening in the lower portion of the front side and the front portion of the bottom side;

a take-up roller extending longitudinally of, and rotatably mounted in, said case body;

an awning rolled on said take-up roller to be extended through said opening;

a lead bar disposed over said opening and cooperating with said case body to form an enclosed case, said lead bar having a front wall covering the lower portion of said front side and a bottom wall covering the front portion of said bottom side;

means for holding said lead bar releasably in place in said case body and permitting movement of the lead bar out of the opening and away from the case body, said awning having one edge connected to the lead bar to be unrolled and extended thereby;

two elongated legs pivotally connected to the lead bar adjacent its opposite ends, and each extending along the bottom of the case toward the center thereof, each of said legs being of flattened generally rectangular cross-sectional shape and having a relatively wide side adjacent the case, said legs also being connected to the lead bar for rotation about an axis extending longitudinally of the leg when the leg is in a released position and extends downwardly from the lead bar;

a leg lock housing disposed between the free ends of said legs and substantially filling the space between them, said housing being of substantially the same cross-sectional shape as said legs to present an appearance of continuity along the case;

means on said leg lock housing for holding the free ends of the legs in the storage position and releasing the legs for movement away from the case for attachment to a vehicle;

said legs being longitudinally extendable and contractable for adjustment of the awning assembly; and rafters disposed in said case and having inner ends hinged on the case body near its opposite ends, and outer ends hinged on the central portion of said lead bar, said rafters being longtudinally extendable and contractable in response to movement of the lead bar away from and back into the case;

and means operable as an incident to a preselected amount of movement of the lead bar away from the case body to latch said rafters releasably against longitudinal contraction, thereby to brace said lead bar in an extended position.

2. An awning assembly as defined in claim 1 wherein said lead bar has two spaced first flanges extending into the lower portion of said case body, and said case body has two spaced second flanges extending from said back wall toward said lead bar, said rafters being stored in channels defined between said flanges and having outer ends hinged on said first flanges and inner ends hinged on said second flanges.

3. An awning assembly as defined in claim 2 in which the outer ends of said rafters are hinged on said lead bar on opposite sides of its longitudinal midpoint.

4. An awning assembly as defined in claim 1 in which said end plates project downwardly beyond said case body and cover the ends of said legs, having a shape that generally conforms to the cross-sectional shape of said legs.

5. An awning assembly as defined in claim 4 in which said top wall has a contour similar to the shape of said legs, whereby the legs appear as part of said case.

6. An awning assembly as defined in claim 1 in which each of said legs comprises outer and inner elongated members of relatively flat channel-shaped cross-section that are nested together to telescope longitudinally relative to each other, and further include means for latching said inner and outer members in selected telescoped positions.

7. An awning assembly as defined in claim 6 in which said means for latching said leg members include spring-loaded detent pins carried by one of said leg members and engageable in selected different positioning holes in the other member.

8. An awning assembly as defined in claim 7 further including push-button leg release actuators on said detent pins.

9. An awning assembly as defined in claim 6 in which said means for latching said leg members also include a second set of pins carried by one of said leg members and slidably engaged in the other member, and further including means for selectively releasing said second set of pins from said other member to permit the leg to bend with a knee-like action.

10. An awning assembly as defined in claim 9 further including means for limiting such bending to a selected angular relation.

11. An awning assembly as defined in claim 6 in which said leg latch housing has open ends facing toward said legs, an outside shape similar to the shape of said outer members, and an inside shape for receiving said inner members.

12. An awning assembly as defined in claim 11 in which said inner members have latching pins near their free ends, and said leg latch housing has leg latches that are engageable with said latching pins to hold said inner members releasably in said housing.

13. An awning assembly as defined in claim 12 further including means defining access openings for an operating tool for unlatching said latches and sliding said inner members into and out of said housing.

14. An awning assembly as defined in claim 12 further including leg brackets mountable on the side of a vehicle to receive said latching pins when said legs are released from said case, said brackets having notches for receiving said latching pins, and said notches having opposed shoulders defining restricted openings for maintaining the latching pins in the notches.

15. An awning assembly for attachment to the side of a vehicle, comprising:
an elongated case body defining a partial enclosure for an awning and having at least one open side;
a take-up roller in said case body;
an awning having first and second opposite ends and attached at the first end to the roller and rolled on the roller in the case body for extension of said awning through said open side;
a lead member having closed and open positions and shaped to close the open side of the case body and to cooperate with the case body to form an enclosed case in the closed position, the lead member being attached to the second end of the awning;
means for holding said lead member releasably relative to said case body in the closed position to form the enclosure and providing for movement of the lead member from the case body to the open position;
a pair of elongated members each having first and second opposite ends and each pivotably attached at the first end to the case body and pivotably attached at the second end to the lead member and each extending along the bottom of the case member toward the center of the case member with the lead member disposed in the closed position and each movable with the lead member during the movement of the lead member to the open position; and
means in the case body for releasably retaining the elongated members in the case body in the closed position of the lead member.

16. An awning assembly as defined in claim 15 in which each of the two elongated members is formed from at least a pair of members in a telescopic relationship and in which the telescopic members in each elongated member adjust telescopically in accordance with the movements of the lead member and in which the elongated members are connected at the first ends to the case body at positions near the sides of the case body and at the second ends to the lead member at a central position along the lead member.

17. An awning assembly as set forth in claim 16, including,
a pair of elongated legs each having first and second ends and each connected at the first end to the lead member in pivotal and swiveling relationship to the lead member and each being free at the second end for attachment to the side of the vehicle, and
means for latching the legs to the case body at the bottom of the lead member in the closed position.

18. An awning assembly as set forth in claim 17, including,
the elongated legs being connected to the lead member at positions near the sides of the lead member and being pivotable in the closed position of the lead member to positions extending toward the center of the lead member and latching means being disposed at an intermediate position along the length of the legs in the closed position of the lead member.

19. An awning assembly as set forth in claim 18 wherein
the case body is shaped to define an open channel at the bottom of the case body and the legs are shaped to be disposed in this channel in the closed position of the lead member.

20. An awning assembly as set forth in claim 19 wherein
the elongated members are disposed within the enclosure in the case body in the closed position of the lead member and the open channel is open at its bottom and is disposed below the enclosure in the case body and the elongated legs are disposed in the open channel.

21. An awning assembly as set forth in claim 20 wherein the bracing legs are simultaneously movable pivotally and longitudinally between the storage and operating positions.

22. An awning assembly as defined in claim 15 in which each of said legs comprises inner and outer relatively flat channel-shaped members that are nested and connected together for telescoping extension and contraction, the outer member being pivotally and swivelly connected to said lead member, and said inner member having means adjacent one end for engagement with said means for latching said legs in said storage positions.

23. An awning assembly as defined in claim 22 in which said latching means comprise a leg lock housing centrally mounted on the underside of said case body and having substantially the same outside shape as said legs, said housing having open ends receiving the adjacent ends of said inner members, and having latch plates releasably latching the inner sections in said housing.

24. An awning assembly as defined in claim 15 further including at least one elongated, longitudinally extendable and contractable rafter disposed in said case and hingedly connected at one end to said case body and at the other end to said lead member and pivotable and extensibly movable with the lead member into a bracing position for the awning as the lead member is moved away from said case body.

25. An awning assembly as defined in claim 24 in which said rafter has means thereon for releasably holding it in an extended position.

26. An awning assembly as defined in claim 25 in which two such rafters are disposed in said case, one being connected to each end of said case body and both being connected to the lead member at a control position along the lead member.

27. An awning assembly for attachment to the side of a vehicle:
   an elongated case body with an elongated opening in one wall;
   an outer member having an elongated wall closing said opening and releasably supported on said case body to cooperate with the case body in forming an enclosed case and also to serve as a lead bar for the awning assembly;
   there being a housing extending from the enclosed case to a position below the case body to define a channel open at the bottom;
   an awning stored in said case body and having first and second opposite ends and attached at the first end of the case body and at the second end to said member for extension as said outer member is moved from said case body;
   bracing legs having first and second ends and having the first ends connected to said outer member near the ends of the outer member for pivotal and swiveling movement of the legs and for movement of the first ends of the legs with the outer member to the position of extension of the awning and extending in the channel toward the center of the case body in the stored position of the awning;
   the second ends of the legs being free for attachment to the side of the vehicle; and
   means on the housing for latching said legs releasably in storage positions in the channel in the stored position of the awning.

28. An awning as defined in claim 27 in which a take-up roller is rotatably mounted in the case body and said awning is rolled on the take-up roller in the stored position of the awning.

29. An awning as defined in claim 27 in which said legs are of flattened, generally rectangular cross-sectional shape, and have relatively wide sides facing toward the housing, said legs being connected to said outer member for swiveling as well as pivoting relative thereto, to provide for turning of the legs about an axis extending longitudinally of the legs after they have been released by said latching means to extend downwardly from the outer member.

30. An awning as defined in claim 27 in which each of said legs comprises inner and outer telescoping, channel-shaped members nested for longitudinal sliding, and further including means forming knee-like joints in said members, and releasable detent means for normally holding said members against being at said joints, and for holding said members in different extended positions relative to each other.

31. An awning as defined in claim 30 in which said housing has substantially the same outside shape as said outer leg members and substantially fills the space between the adjacent ends of said legs in the storage positions, said housing having open ends facing toward said legs, and said inner leg sections being extended into said housing and releasably latched therein.

32. An awning assembly as defined in claim 30 in which said housing and said outer leg members are of flattened cross-section, with relatively wide sides facing each other.

33. An awning assembly as defined in claim 27 further including at least one longitudinally extendable and contractable rafter in said case body, said rafter having one end hingedly connected to said case body and an opposite end hingedly connected to said outer member, to be extended into a bracing position as the outer member is moved from the case body, and further including means on the rafter for releasably preventing contraction from the extended position of the rafter.

34. An awning assembly as defined in claim 27 further including a mounting bracket for mounting said case body on a curved surface on the side of the vehicle, said bracket having an arcuate body formed with a plurality of outwardly opening, angularly spaced mounting grooves therein, and a foot at each end of said body for engagement with the curved surface; and
   a supporting bracket engageable with said mounting bracket, said supporting bracket having at least two legs thereon engageable with at least two selected mounting grooves of said mounting bracket, to be supported thereby in different angular positions, and having a backing for connection to said case body.

35. An awning assembly for a recreational vehicle, comprising:
   an elongated, enclosed awning case mountable on the recreational vehicle and having one elongated sidewall separated from the remainder of the case;
   means on said case for normally supporting said sidewall on the case and providing for movement of said sidewall outwardly away from the case;
   an awning having first and second opposite ends;
   an elongated take-up roller rotatably mounted in the case to store an awning therein, and having means for attachment to the first end of the awning,
   means included in the sidewall for attachment to the second end of the awning to extend the awning as the sidewall is moved outwardly from the case;

means operatively associated with the roller for biasing the roller to the closed position of the awning; and bracing legs having first and second ends and pivotably connected at the first end to said sidewall and pivotally connected at the second end to the case for movement between storage positions in the case and operating positions extending from the sidewall to the vehicle when the sidewall is separated from the case.

36. An awning as defined in claim 35 further including in said case two longitudinally extendable and contractable rafters having outer ends hingedly connected to said sidewall in the central portion of the sidewall, said rafters extending longitudinally in opposite directions in said case to positions near the sides of the case and having inner ends hingedly connected to a stationary portion of the case, to be extended into bracing relationship in the operating positions, and means for latching the bracing legs releasably in the operating positions.

37. An awning as defined in claim 35 in which said sidewall has an inwardly extending flange forming part of the bottom of said case, and said bracing legs are pivotally and swivelly connected to said flange for swinging and turning between the storage and operating positions.

38. An awning as defined in claim 37 further including leg latch means centrally on said case between the adjacent ends of said legs when the latter are in said storage positions, said leg latch means including a housing extending between said adjacent ends, and latching means for holding the legs releasably in said storage positions.

39. An awning assembly for attachment to the side of a vehicle, comprising:
   an elongated case body defining a partial enclosure for an awning and having at least one open side;
   a take-up roller in said case body;
   an awning having first and second opposite ends and attached at the first end to the roller and rolled on the roller in the case body for extension of the awning through the open side;
   a lead member having closed and open positions and shaped to close the open side of the case body in the closed position;
   means for holding said lead member releasably relative to said casing in the closed position to form the enclosure and providing for movement of the lead member from the case body to the open position;
   a pair of legs having first and second ends, the first ends being attached to the lead member at spaced positions along the lead member for turning and pivotal motion and the second ends being free for attachment to the side of the vehicle, the legs being pivotable to a position for storage at the bottom of the case body in the closed position of the lead member; and
   means disposed in the case body for releasably latching the elongated members in the case body in the closed position of the case body.

40. An awning assembly as set forth in claim 39 wherein
   each of the legs extends inwardly from the side of the case body in the closed position of the lead member and in which the latching means are disposed in the case body at an intermediate position along the length of the legs and in which the legs are connected to the lead member for pivotal and swiveling movement relative to the case body.

41. An awning assembly as defined in claim 39 in which the front of said case body is open, and said lead member has an upright wall fitting into and closing said front.

42. An awning assembly as defined in claim 41 in which the front part of the bottom of said case body also is open, and said lead member has a flange projecting rearwardly from said upright wall and closing the open part of the bottom of said case body.

43. An awning assembly as defined in claim 39 in which said legs are of flattened, generally rectangular cross-sectional shape having relatively wide sides, and are connected to said lead member for both pivoting and swiveling motion, said legs being stored with the relative wide sides facing toward said case body.

44. An awning assembly as defined in claim 43 in which said means for releasably latching said legs comprise a leg latch housing on the underside of the case body between the free ends of said legs, said housing being of substantially the same cross-sectional shape as said legs and having ends closely adjacent the ends of said legs and including latches thereon for releasably holding the legs in the storage positions.

* * * * *